US009092475B2

(12) United States Patent
Schreter

(10) Patent No.: US 9,092,475 B2
(45) Date of Patent: Jul. 28, 2015

(54) DATABASE LOG PARALLELIZATION

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 13/290,286

(22) Filed: Nov. 7, 2011

(65) Prior Publication Data

US 2013/0117234 A1 May 9, 2013

(51) Int. Cl.
*G06F 7/00* (2006.01)
*G06F 17/30* (2006.01)
*G06F 11/14* (2006.01)

(52) U.S. Cl.
CPC ...... *G06F 17/30368* (2013.01); *G06F 11/1474* (2013.01); *G06F 17/3007* (2013.01)

(58) Field of Classification Search
USPC .................................. 707/756, 736, 999.102
See application file for complete search history.

(56) References Cited

U.S. PATENT DOCUMENTS

| 5,530,850 | A * | 6/1996 | Ford et al. ..................... 707/813 |
| 6,222,449 | B1 * | 4/2001 | Twining ................... 340/539.11 |
| 6,950,848 | B1 * | 9/2005 | Yousefi'zadeh ............... 709/203 |
| 7,698,319 | B2 * | 4/2010 | Taniguchi et al. ............ 707/674 |
| 7,860,824 | B2 * | 12/2010 | Suzuki et al. ................. 707/609 |
| 2002/0002598 | A1 * | 1/2002 | Van Allen et al. ............ 709/219 |
| 2003/0061537 | A1 | 3/2003 | Cha et al. |
| 2003/0229650 | A1 | 12/2003 | Olstad et al. |
| 2007/0067366 | A1 * | 3/2007 | Landis .......................... 707/205 |
| 2007/0299885 | A1 * | 12/2007 | Pareek et al. ................. 707/202 |
| 2009/0019094 | A1 * | 1/2009 | Lashley et al. ............... 707/203 |
| 2011/0004586 | A1 * | 1/2011 | Cherryholmes et al. ...... 707/682 |
| 2011/0029581 | A1 * | 2/2011 | Zhao et al. ..................... 707/812 |

OTHER PUBLICATIONS

Gupta et al. "Recovery in Main-Memory Database", Computer Science Department University of Wisconsin, Madison WI, May 14, 1999, pp. 1-16, XP002692498,Madison WI, Retrieved from the Internet: URL:http://citeseerx.istpsu.eduiviewdoc/download-?doi=10.1.1.105.2719&rep=repl &type=pdf [retrieved on Feb. 20, 2013].
Qin et al. "A Parallel Recovery Scheme for Update Intensive Main Memory Database Systems", Parallel and Distributed Computing, Applications and Technologies, 2008. PDCAT 2008. Ninth International Conference on, IEEE, Piscataway, NJ, USA, Dec. 1, 2008, pp. 509-516, XP031373748, ISBN: 978-0-7695-3443-5.

* cited by examiner

*Primary Examiner* — Hosain Alam
*Assistant Examiner* — Eliyah S Harper
(74) *Attorney, Agent, or Firm* — Mintz Levin Cohn Ferris Glovsky and Popeo, P.C.

(57) ABSTRACT

A plurality of transactions in a data storage application are executed during which log entries according to the plurality of transactions are stored in a plurality of log buffers. The log entries are sequentially written into a current log buffer and the plurality of log buffers are written to a plurality of log partitions according to a round-robin distribution. Thereafter, in response to a data recovery event, a sequential list of the log entries in the log buffers are assembled to generate a log that can be used for data recovery by the data storage application. Related apparatus, systems, techniques and articles are also described.

15 Claims, 4 Drawing Sheets

DATABASE LOG PARALLELIZATION

TECHNICAL FIELD

The subject matter described herein relates to techniques for generating parallel database logs that enable simplified data recovery.

BACKGROUND

Conventional databases typically use logging to store operations performed on corresponding data in a synchronous fashion to a log while, at the same time, writing data to a corresponding data area asynchronously. In cases of a crash or other data recovery event, the data area is recovered to a potentially older state. Replaying the log will bring the database to the last committed state. Therefore, logging is an important performance-critical component of a database, both with respect to on-line operations as well as data recovery.

SUMMARY

In one aspect, a plurality of transactions in a data storage application are executed. Log entries according to the plurality of transactions are stored in a plurality of log buffers. The log entries are sequentially written into a current log buffer and the plurality of log buffers are written to a plurality of log partitions according to a round-robin distribution. Thereafter, in response to a data recovery event, a sequential list of the log entries in the log buffers are assembled to generate a log that can be used for data recovery by the data storage application.

The current subject matter can be operable with a wide variety of data storage applications including, without limitation, in-memory databases. At least two log buffers written to a single log partition can be non-consecutive (which is an artifact of the round-robin distribution scheme).

Each log buffer can include an I/O finished flag that indicates that an input/output operation associated with the log buffer has been finished (i.e., the log buffer has been written to a corresponding log partition, etc.). Each log buffer can also include a previous I/O finished flag indicating that an immediately preceding log buffer in the round-robin distribution has been written to a corresponding log partition.

Each log buffer can have an associated set of commit callbacks such that the previous I/O finished flag in a current log buffer is set after the set of commit callbacks for the immediately preceding log buffer are called.

The set of commit callbacks of each log buffer can be notified about successful commit calls when both corresponding I/O finished and previous I/O finished flags have been set.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the log partitions provided herein are seen as a single logical log partition thereby acting as a linear log which allows for a simplified replay as compared to conventional databases (i.e., less complicated replay algorithms can be used thereby reducing processing consumption as well as time to replay, etc.). In addition, the current subject matter allows for more efficient reconstruction of OLAP transactions which typically comprise large load operations using only a single log partition. More specifically, the current subject matter is advantageous in that it ensures commit durability across log partitions which in turn ensures a correct ordering of commit callbacks (the same as the ordering of logging commit records).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
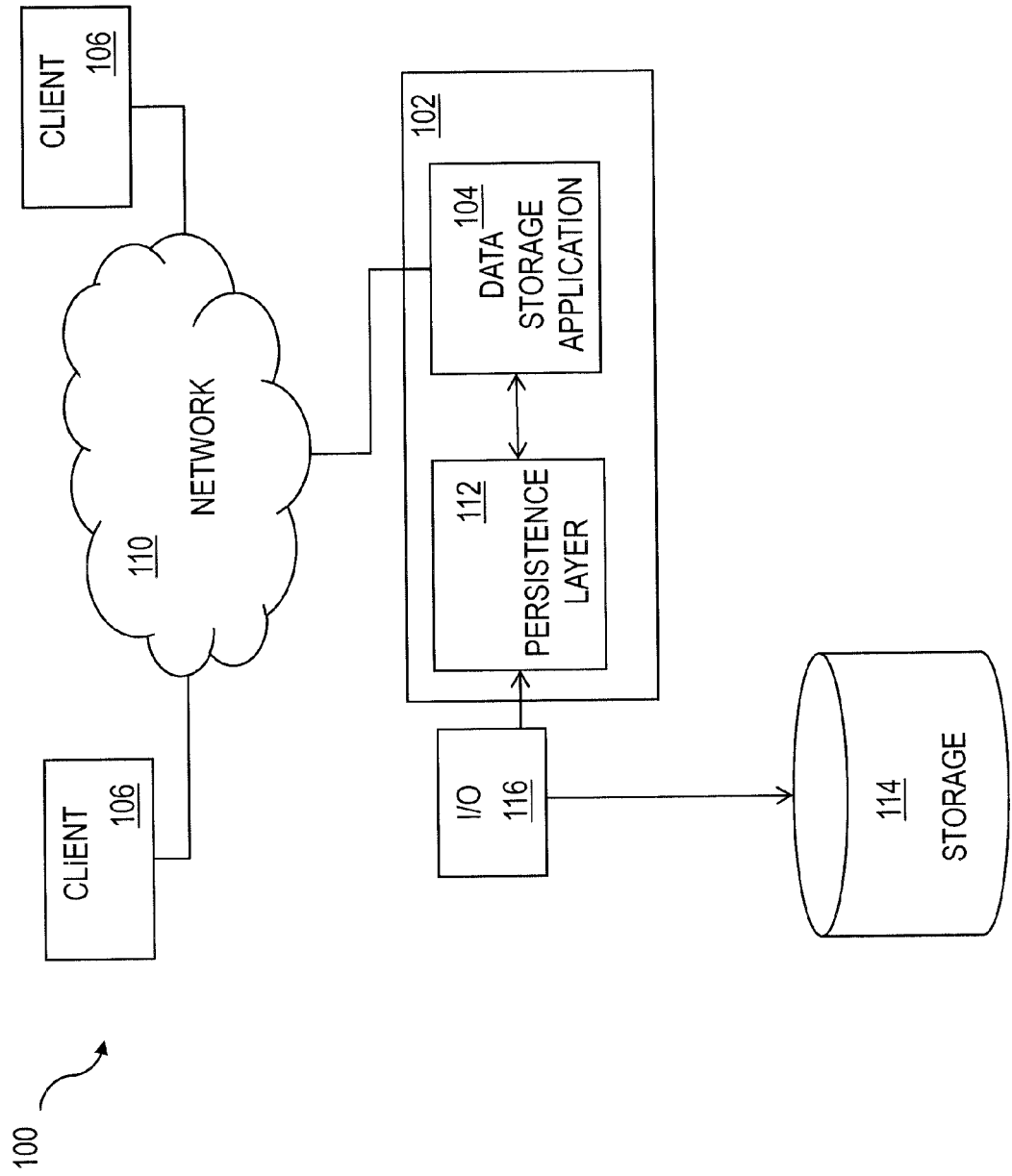
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
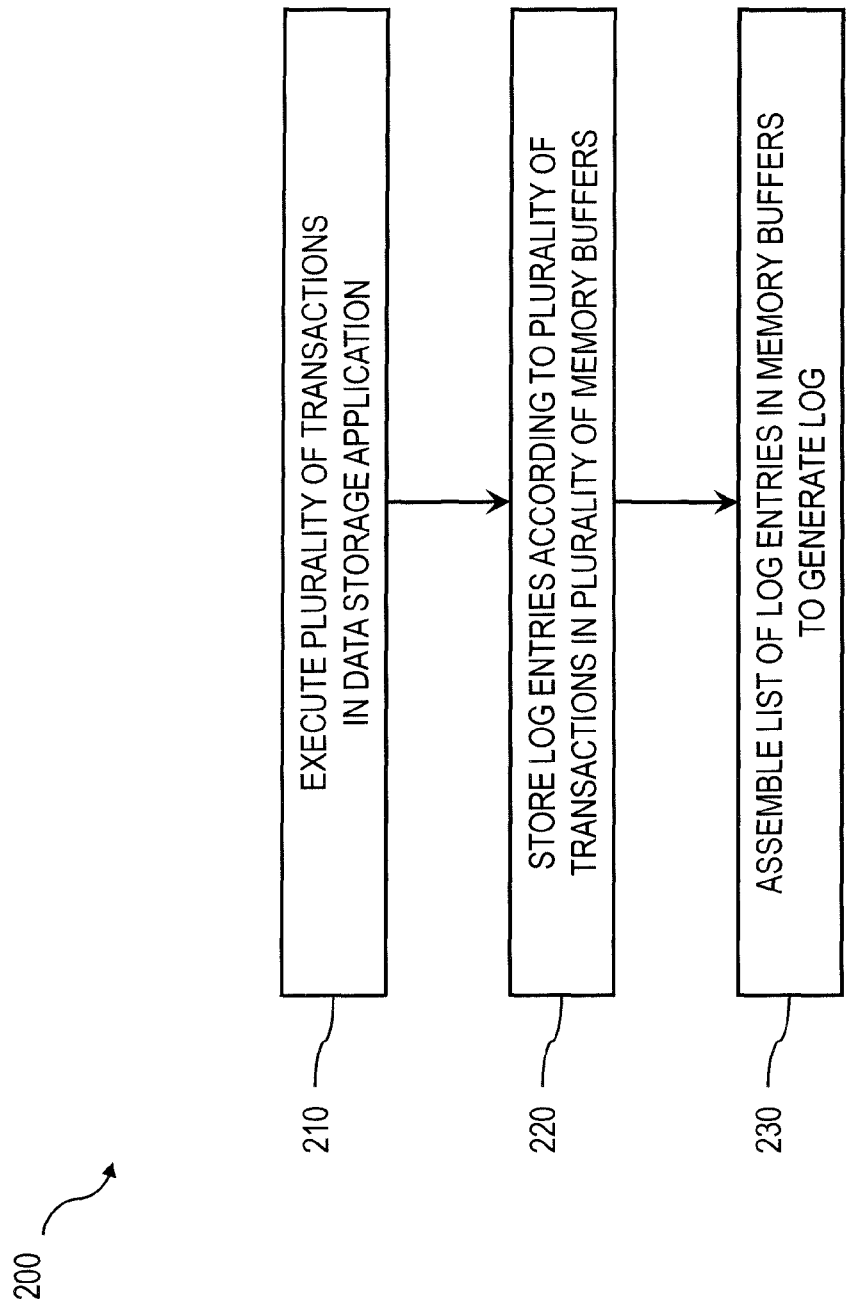
FIG. 2 is a process flow diagram illustrating a technique for generating a data recovery log for a data storage application.

FIG. 2 is a process flow diagram 200 in which, at 210, a plurality of transactions are executed in a data storage application. Log entries corresponding to the plurality of transactions are stored, at 220, in a plurality of log buffers. At one time, exactly one log buffer is the "current buffer", into which the log entries are stored in order, as they are generated by transactions. When this buffer becomes full, a next buffer is picked as the current buffer and original current buffer is written to a log partition. A log partition to write a log buffer is chosen in round-robin fashion from the plurality of log partitions. Thereafter, in response to a data recovery event, at 230, a sequential list of the log entries is assembled to generate a log that can be used for data recovery by appropriately concatenating data from log buffers read from plurality of log partitions ordered by log sequence number of the first entry in respective log buffer. Ordering of this list of entries matches 1:1 the ordering of the entries as they were generated during log writing.

Figure 3:
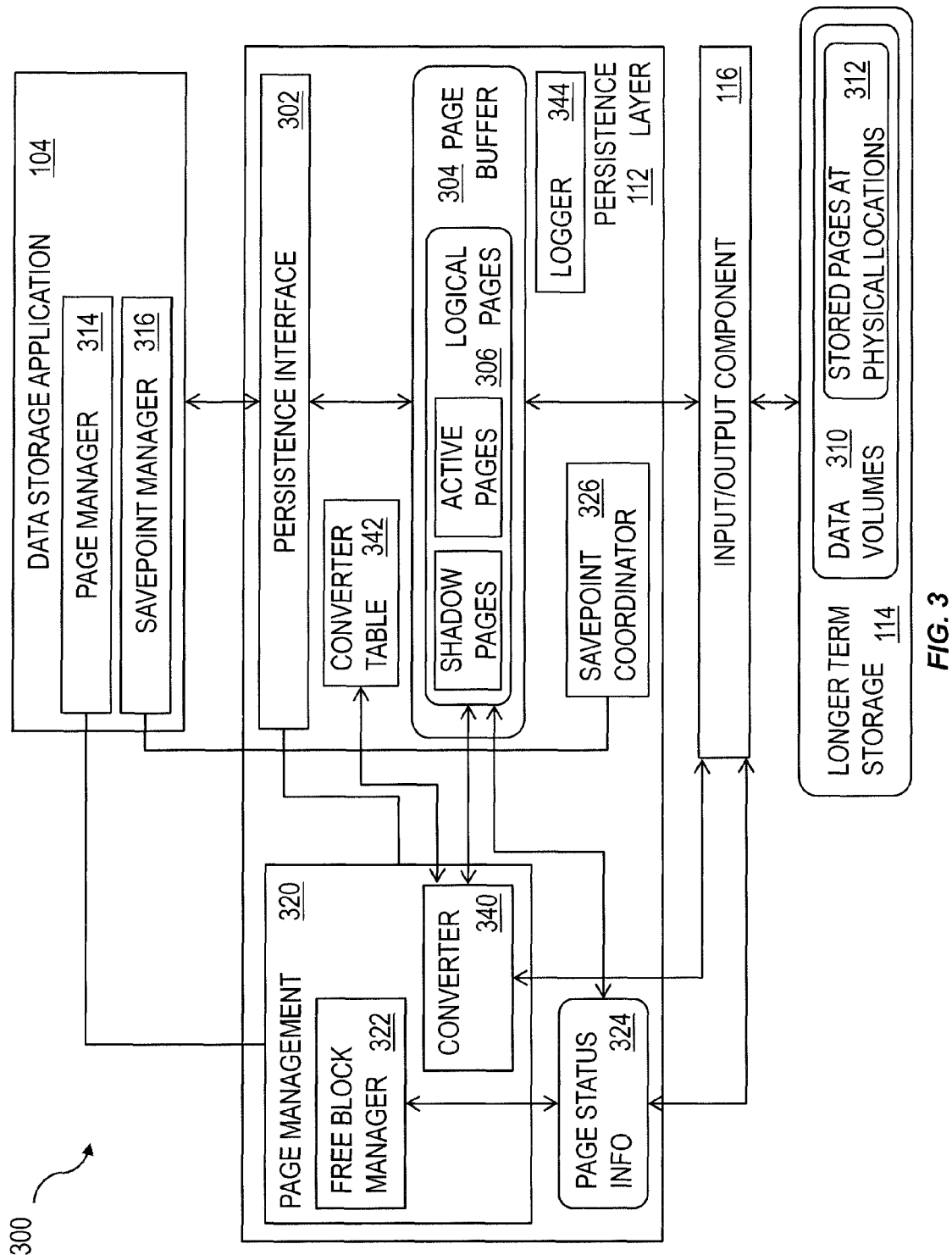
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of log buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a log buffer in natural order (e.g., sequential order, etc.). If several physical hard disks/storage devices are used to store log data, several log partitions can be defined. Thereafter, the logger 344 (which as stated above acts to generate and organize log data) can load-balance writing log buffers to all available log partitions. In some cases, the load-balancing is according to a round-robin distributions scheme in which various writing operations are directed to log partitions in a sequential and continuous manner. With this arrangement, log buffers written to a single log segment of a particular partition of a multi-partition log are not consecutive. However, the log buffers can be reordered from log segments of all partitions during recovery to the proper order.

Figure 4:
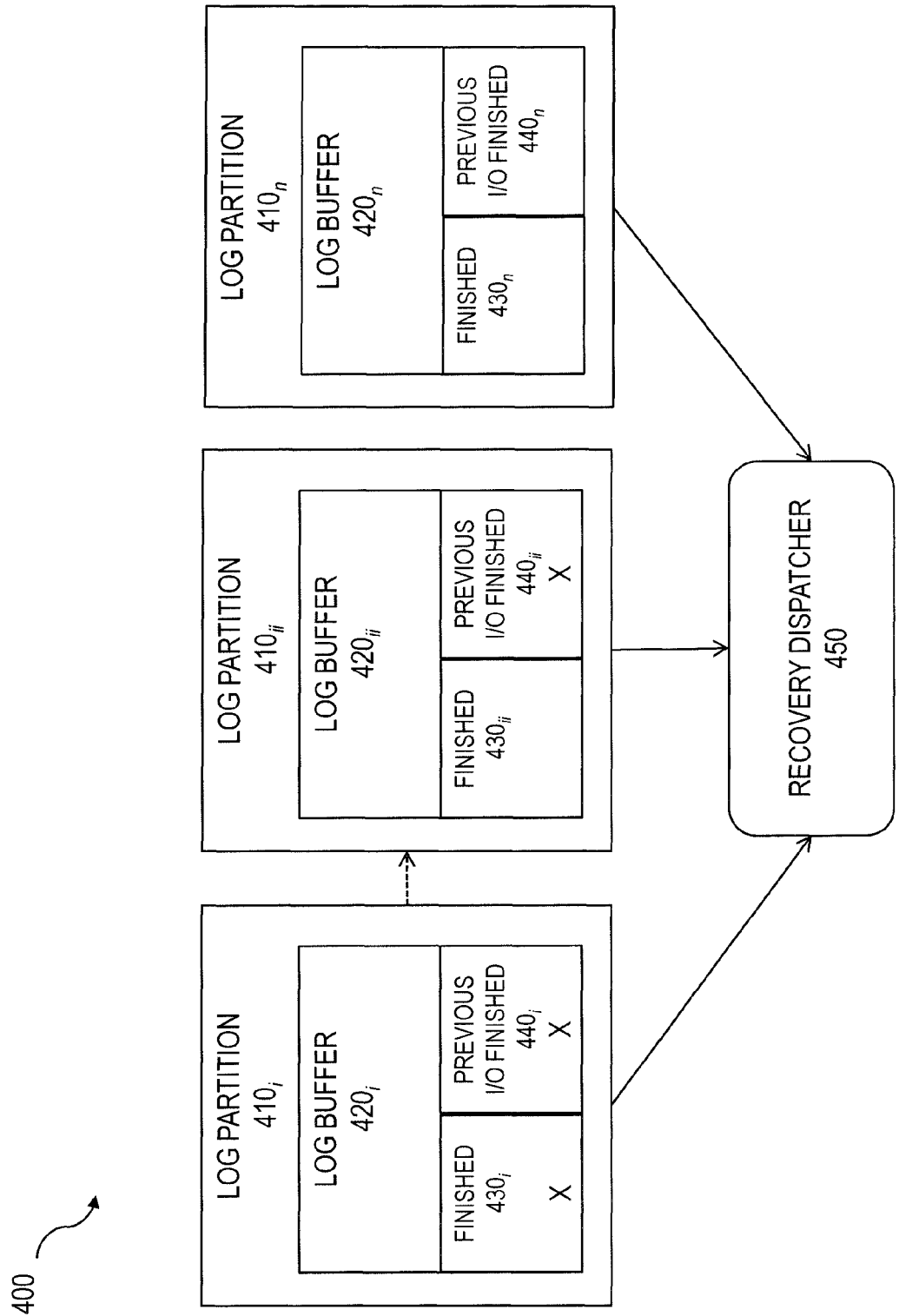
FIG. 4 is a diagram illustrating log buffers stored in a plurality of log partitions.

With reference to the diagram 400 of FIG. 4, to ensure commit durability, log buffers $420_{i\ldots n}$ across partition in memory across log partitions $410_{i\ldots n}$ can be changed in I/O order and each log buffer $420_{i\ldots n}$ can be associated with (i) an I/O finished flag $430_{i\ldots n}$, (ii) a previous I/O finished flag $440_{i\ldots n}$, and (iii) a set of commit callbacks. The I/O finished flag can be updated when the log buffer is securely written to the log partition (in the example of FIG. 4 flag $430_i$ of log partition $410_i$). At this event, either the previous I/O flag $440_i$ is already set (meaning that all previous I/O log buffers in the round-robin distribution scheme have already been written) or not. In cases in which all previous I/Os have been finished, the commit callbacks are notified about successful commit calls and the previous I/O finished flag $440_{ii}$ can be set to the next subsequent buffer log $420_{ii}$. In cases in which the next log buffer $420_{ii}$ has already been written (i.e., the I/O finished flag $440_{ii}$ is set), commit callbacks of the next log buffer $420_{ii}$ are called and the next subsequent log buffer (i.e., the "next-next log buffer") previous I/O finished flag can be set (not shown). This process continues until a log buffer that has not yet been written to its respective log partition is located (e.g., the currently-used log buffer or a log buffer which is still in I/O state, etc.).

During recovery, a recovery dispatcher 450 processes the log buffers $420_{i\ldots n}$ sent to it from individual log partitions $410_{i\ldots n}$ and reorders them into a proper order. This reordering restores an original order of log entries, as they were written in an on-line operation. This arrangement obviates the need for special synchronization and/or handling of potential reordered log entries causing data conflicts (the resolution of which can require complex algorithms).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor of at least one computing system to perform operations comprising:
   executing a plurality of database transactions in a data storage application;
   storing log entries according to the plurality of database transactions in a plurality of log buffers, the log entries being sequentially written into a current log buffer;
   writing each of the plurality of log buffers to one of a plurality of log partitions according to a round-robin distribution to effect load balancing, each log partition being stored in a separate physical storage device; and
   assembling, in response to a data recovery event, a sequential list of the log entries in the log buffers to generate a log, the log being used for data recovery by the data storage application;
   wherein:
      log buffers written to a single log segment of a particular partition are not consecutive,
      each log buffer comprises an I/O finished flag indicating that an input/output operation writing the log buffer to a corresponding log partition has been finished;
      each log buffer comprises a previous I/O finished flag indicating that an immediately preceding log buffer in the round-robin distribution has been written to a corresponding log partition.

2. A computer program product as in claim 1, wherein the data storage application comprises an in-memory database.

3. A computer program product as in claim 1, wherein each log buffer has an associated set of commit callbacks, and wherein the previous I/O flag of the current log buffer is set after the set of commit callbacks for the immediately preceding log buffer are called.

4. A computer program product as in claim 3, wherein the set of commit callbacks of each log buffer are notified about successful commit calls when both corresponding I/O finished and previous I/O finished flags have been set.

5. A method for implementation by one or more programmable processors forming part of at least one computing system comprising:
   executing a plurality of database transactions in a data storage application;
   storing log entries according to the plurality of transactions in a plurality of log buffers, the log entries being sequentially written into a current log buffer;
   writing each of the plurality of log buffers to one of a plurality of log partitions according to a round-robin distribution to effect load balancing, each log partition being stored in a separate physical storage device; and
   assembling, in response to a data recovery event, a sequential list of the log entries in the log buffers to generate a log, the log being used for data recovery by the data storage application;
   wherein:
      log buffers written to a single log segment of a particular partition are not consecutive;
      each log buffer comprises an I/O finished flag indicating that an input/output operation writing the log buffer to a corresponding log partition has been finished;
      each log buffer comprises a previous I/O finished flag indicating that an immediately preceding log buffer in the round-robin distribution has been written to a corresponding log partition.

6. A method as in claim 5, wherein the data storage application comprises an in-memory database.

7. A method as in claim 6, wherein at least two log buffers written to a single log partition are not consecutive.

8. A method as in claim 5, wherein each log buffer has an associated set of commit callbacks, and wherein the previous I/O flag of the current log buffer is set after the set of commit callbacks for the immediately preceding log buffer are called.

9. A method as in claim 8, wherein the set of commit callbacks of each log buffer are notified about successful commit calls when both corresponding I/O finished and previous I/O finished flags have been set.

10. A system comprising:
    a plurality of physical storage devices;
    at least one programmable processor; and
    a non-transitory machine-readable medium storing instructions that, when executed by the at least one programmable processor, cause the at least one programmable processor to perform operations comprising:
       executing a plurality of database transactions in a data storage application;
       storing log entries according to the plurality of transactions in a plurality of log buffers, the log entries being sequentially written into a current log buffer;
       writing each of the plurality of log buffers to one of a plurality of log partitions according to a round-robin distribution to effect load balancing, each log partition being stored in a separate physical storage device; and
       assembling, in response to a data recovery event, a sequential list of the log entries in the log buffers to generate a log, the log being used for data recovery by the data storage application;
       wherein:
          log buffers written to a single log segment of a particular partition are not consecutive;
          each log buffer comprises an I/O finished flag indicating that an input/output operation writing the log buffer to a corresponding log partition has been finished;
          each log buffer comprises a previous I/O finished flag indicating that an immediately preceding log buffer in the round-robin distribution has been written to a corresponding log partition.

11. A system as in claim 10, wherein the data storage application comprises an in-memory database.

12. A system as in claim 10, wherein:
    each log buffer has an associated set of commit callbacks,
    the previous I/O flag of the current log buffer is set after the set of commit callbacks for the immediately preceding log buffer are called, and
    the set of commit callbacks of each log buffer are notified about successful commit calls when corresponding previous I/O finished flags have been set.

13. A computer program product as in claim 1, wherein each log partition can be associated with an input/output (I/O) finished flag, a previous I/O finished flag, and a set of commit callbacks to ensure commit durability.

14. A method as in claim 5, wherein each log partition can be associated with an input/output (I/O) finished flag, a previous I/O finished flag, and a set of commit callbacks to ensure commit durability.

15. A system as in claim 10, wherein each log partition can be associated with an input/output (I/O) finished flag, a previous I/O finished flag, and a set of commit callbacks to ensure commit durability.

* * * * *